March 17, 1970  R. R. ERNST  3,501,691
SINGLE SIDEBAND SYSTEM FOR IMPROVING THE SENSITIVITY
OF GYROMAGNETIC RESONANCE SPECTROMETERS
Filed May 8, 1968  3 Sheets-Sheet 1
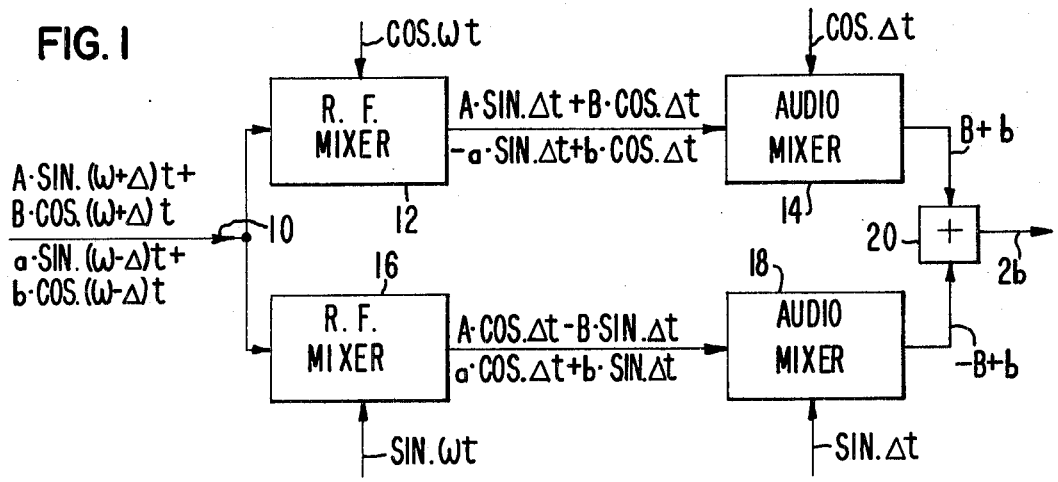
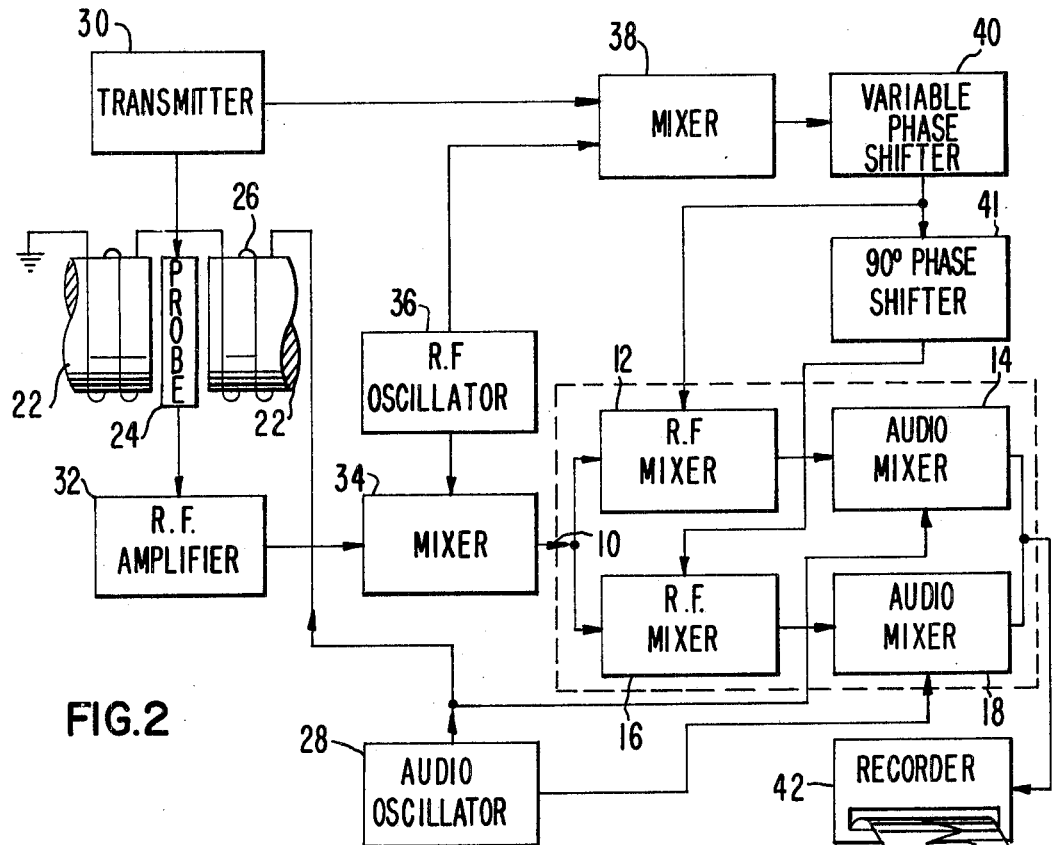
INVENTOR.
RICHARD R. ERNST
BY
ATTORNEY March 17, 1970  R. R. ERNST  3,501,691
SINGLE SIDEBAND SYSTEM FOR IMPROVING THE SENSITIVITY
OF GYROMAGNETIC RESONANCE SPECTROMETERS
Filed May 8, 1968  3 Sheets-Sheet 2

INVENTOR.
RICHARD R. ERNST
BY
ATTORNEY

March 17, 1970 R. R. ERNST 3,501,691
SINGLE SIDEBAND SYSTEM FOR IMPROVING THE SENSITIVITY
OF GYROMAGNETIC RESONANCE SPECTROMETERS
Filed May 8, 1968 3 Sheets-Sheet 3
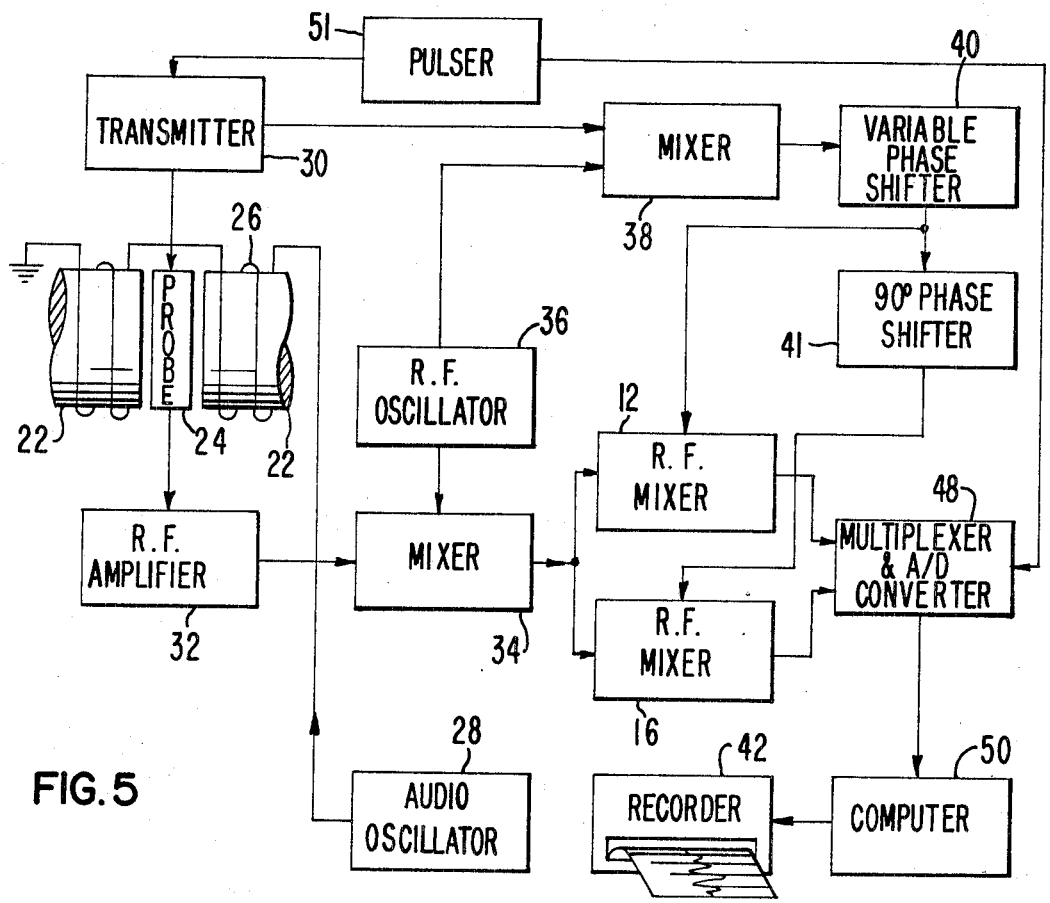
FIG. 5
FIG. 6
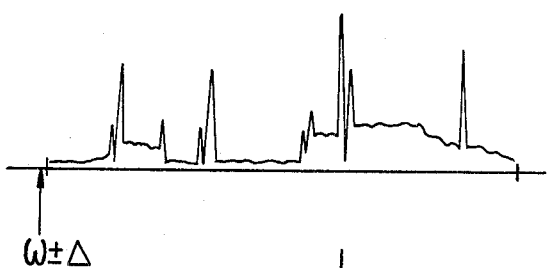
(a)
$\omega \pm \Delta$
(b)
$\omega \pm \Delta$
INVENTOR.
RICHARD R ERNST
BY
*Wm J Nolan*
ATTORNEY United States Patent Office 3,501,691
Patented Mar. 17, 1970

3,501,691
SINGLE SIDEBAND SYSTEM FOR IMPROVING THE SENSITIVITY OF GYROMAGNETIC RESONANCE SPECTROMETERS
Richard R. Ernst, Winterthur, Switzerland, assignor to Varian Associates, Palo Alto, Calif., a corporation of California
Filed May 8, 1968, Ser. No. 727,535
Int. Cl. G01r 33/08
U.S. Cl. 324—.5       7 Claims

ABSTRACT OF THE DISCLOSURE

A system for improving by a factor of $\sqrt{2}$ the sensitivity of any gyromagnetic resonance spectrometer using a sideband modulation technique. The intermediate frequency of the system is fed into two phase detectors or mixers which are driven with the quadrature voltages of the reference frequency and the outputs thereof are fed into two other phase detectors driven with the quadrature voltages of the modulation frequency. The resulting two outputs are then additively combined such that the unwanted sideband is eliminated.

Statement of the invention

Figure 3:
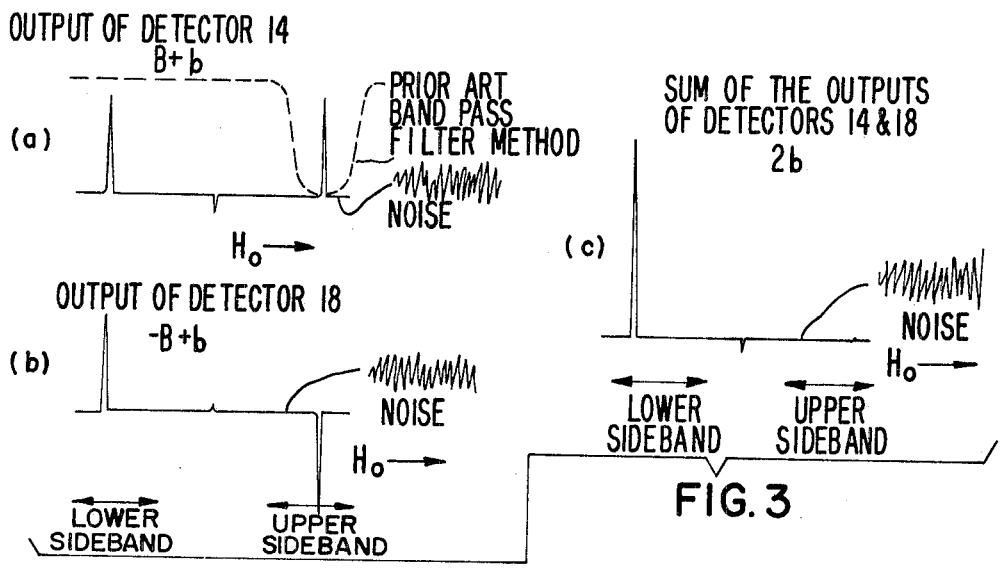

The present invention relates in general to gyromagnetic resonance spectrometers and more particularly to a novel method and apparatus for improving by a factor of $\sqrt{2}$ the sensitivity of any gyromagnetic resonance spectrometer using a sideband modulation technique.

Description of the prior art

Many modern gyromagnetic resonance spectrometers utilize a sideband modulation technique whereby the magnetic field or the R.F. frequency is modulated with an audio frequency in order to produce sideband resonances. Usually in these systems only one of the first two sidebands produced is used to achieve resonance in the sample, the other is typically filtered out in the receiver network using a narrow bandpass filter. Several modifications of these types of systems along with a detailed discussion of the theory involved are disclosed in U.S. Patents Nos. 3,147,428 and 3,173,084 to W. A. Anderson, which are assigned to the assignee of the present invention.

While the filter method does eliminate the unwanted sideband, the reduced signal-to-noise ratio inherent in sideband modulation systems remains. (It is well known that the sensitivity of any sideband modulation scheme is reduced by a factor of $\sqrt{2}$ by the presence of the unwanted sideband which carries only noise power but no signal energy.)

Most conventional detector schemes do not provide for the actual separation of the two sidebands but instead rely on the bandpass concept even though certain other disadvantages result therefrom. Some of these disadvantages are that the system is operable for a single modulation frequency only; the modulation frequency must be large enough to assure that the sidebands are sufficiently far apart; any change in the R.F. or modulation frequency requires a modification of the filter due to the shift in the spectral position of the resultant sidebands; and the filter almost always introduces large phase shifts into the passband which can cause considerable annoyance in the carrying out of many experiments.

Statement of the invention

The present invention is an improvement over the prior art and includes a new single sideband system which eliminates the unwanted sideband by using a combination scheme having an additional set of phase detectors. Using my novel apparatus the sensitivity of the gyromagnetic resonance system is improved by a factor of $\sqrt{2}$ due to the elimination of approximately ½ of the noise power. The system has the advantages of being frequency independent in that the R.F. and modulation frequencies can be changed arbitrarily; no phase shift is introduced into the other sideband; any modulation frequency may be used; and no band stop filters or other critical elements are required.

Object of the invention

It is therefore a principal object of the present invention to provide a means for improving the sensitivity of gyromagnetic resonance apparatus which use single sideband resonance techniques.

Another object of the present invention is to provide a single sideband modulation system which does not require the use of band stop filters or other critical elements.

Still another object of the present invention is to provide a single sideband modulation system for gyromagnetic resonance apparatus which utilizes a pair of phase sensitive detection networks the outputs of which are combined to suppress the unused sideband and thereby increase the sensitivity of the resonance detection system.

Still other objects and advantages of the present invention will become apparent after reading the following description of the preferred embodiments of the invention which are illustrated in the accompanying drawing wherein:

In the drawing

Figure 4:
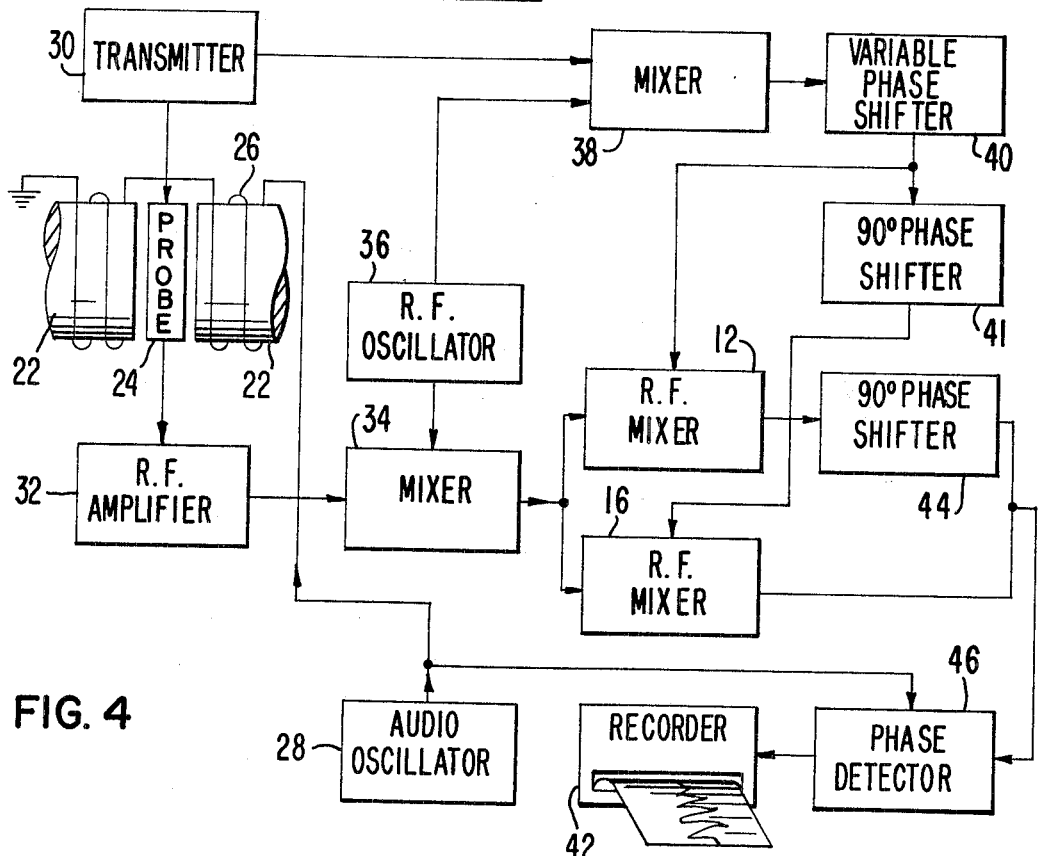

FIG. 1 schematically represents a detector circuit in accordance with the present invention, FIG. 2 schematically represents a single sideband gyromagnetic resonance system incorporating the detection circuit of FIG. 1 in accordance with the present invention, FIG. 3 shows the centerband and sideband spectral distribution of a benzene line and illustrates the operation of the present invention, FIG. 4 illustrates an alternative embodiment of a single sideband gyromagnetic resonance system in accordance with the present invention, FIG. 5 illustrates an alternative embodiment of a single sideband gyromagnetic resonance system in accordance with the present invention for use in Fourier transform spectroscopy, and FIG. 6 illustrates alternate modes of operation of the apparatus of FIG. 5.

Description of the preferred embodiments

Referring now to FIG. 1 of the drawing there is shown a detection circuit in accordance with the present invention in which a signal representative of the upper and lower sideband resonances obtained in the sideband gyromagnetic resonance system to be described below is presented to the circuit at an input lead 10. This modulated signal which has been reduced to an intermediate frequency (I.F.) signal may be represented mathematically as a combination of the expressions (1)       $A \cdot \sin(\omega + \Delta)t + B \cdot \cos(\omega + \Delta)t$ and (2)       $a \cdot \sin(\omega - \Delta)t + b \cdot \cos(\omega - \Delta)t$ whereby (1) represents the upper sideband resonance signal, and (2) represents the lower sideband resonance signal. In these expressions $\omega$ is the intermediate frequency of the system and $\Delta$ is the modulation frequency.

This modulated I.F. signal is fed to an R.F. mixer 12 which simultaneously received a voltage of the I.F. frequency equal to cosine $\omega t$. After demodulation the signal appears at the output of the mixer 12 as the sum of (3) $\qquad A \cdot \sin \Delta t + B \cdot \cos \Delta t$ and (4) $\qquad -a \cdot \sin \Delta t + b \cdot \cos \Delta t$ This signal is then fed into an audio mixer 14 which is simultaneously driven with an audio voltage of the form cosine $\Delta t$ so that a D.C. signal representative of the sum of the magnitudes of the upper and lower sideband signals is developed and which is of the form (5) $\qquad B + b$ At the same time the modulated I.F. signal introduced at lead 10 and represented by the expressions (1) and (2) above is fed to a second R.F. mixer 16 which is simultaneously driven with a quadrature voltage of the I.F. frequency and in the form sine $\omega t$. The demodulated signal appearing at the output of mixer 16 is equal to the sums of (6) $\qquad A \cdot \cos \Delta t - B \cdot \sin \Delta t$ and (7) $\qquad a \cdot \cos \Delta t + b \cdot \sin \Delta t$ This demodulated signal is then fed into a second audio mixer 18 along with a quadrature audio voltage of the form sine $\Delta t$. The resulting D.C. signal produced at the output of mixer 18 is representative of the difference of the magnitudes of the upper and lower sideband signals and can be expressed as (8) $\qquad -B + b$ The D.C. signals thus produced by the mixers 14 and 18 are then added at 20 to give (9) $\qquad B + b + (-B + b) = 2b$ It is readily apparent then, that the effect and function of the mixer network is to suppress all of the signal contributions from the upper sideband and to select the cosine components of the lower sideband in each detection channel and add them together to produce a signal of twice the sideband signal power. It will also be noted that the operation is not a function of a particular value of either $\omega$ or $\Delta$ and is therefore completely frequency independent.

Referring now to FIG. 2 a single sideband gyromagnetic resonance system incorporating the mixer network of FIG. 1 will be described. A pair of magnetic poles 22 provide a unidirectional field $H_0$ into which a sample probe 24 is positioned. The unidirectional field $H_0$ is modulated by an audio frequency signal of frequency $\Delta$ which is applied to coils 26 by an audio signal generator 28.

In order to produce resonance in the sample of probe 24 an R.F. transmitter or oscillator 30 is coupled to the probe 24 to supply an R.F. excitation to the sample in a manner well known in the art. The resulting gyromagnetic resonances which are induced in the sample by the interaction of the crossed R.F. and magnetic fields are detected in the probe 24 and amplified by an R.F. amplifier 32 which is coupled thereto. The amplified resonance signals are then fed to a mixer 34 which is simultaneously driven by an R.F. oscillator 36 to reduce, for convenience, the detected signal frequency to an intermediate range of frequency $\omega$.

In an exemplary embodiment of this system the R.F. transmitter frequency $f_0$ may be equal to 100 megahertz, and the frequency of oscillator 36 may be equal to 95 megahertz so as to produce an intermediate frequency of 5 megahertz when mixed with the 100 megahertz transmitter frequency. The audio frequency $\Delta$ might for example be 2 kilohertz.

The output signal of mixer 34 may be expressed by (1) and (2) above and includes both upper and lower sidebands of which only the lower sideband includes useable signal information but both sidebands contribute noise power. In order to eliminate the upper sideband and its deleterious effects on the resonance signal and to increase the sensitivity of the system, the detection network enclosed in the dashed lines, including a pair of R.F. mixers and a pair of audio frequency mixers, described above with reference to FIG. 1, is incorporated into the system.

The output of mixer 34 including both upper and lower modulation sidebands is coupled to the detection network through lead 10 and simultaneously applied to R.F. mixers 12 and 16. In order to provide the quadrature I.F. voltages for driving mixers 12 and 16 a mixer 38 is coupled to the transmitter 30 and oscillator 36 to produce the required intermediate frequency signal. A variable phase shifter 40 is coupled to mixer 38 for shifting the output of the mixer 38 to a cosine phase. The cosine $\omega t$ output of phase shifter 40 is coupled directly to mixer 12, and to mixer 16 through a 90° phase shifter 41 which provides a sine $\omega t$ signal.

The demodulated outputs of R.F. mixers 12 and 16 are then coupled to audio mixers 14 and 18, which are driven with the quadrature voltages cosine $\Delta t$ and sine $\Delta t$ provided by audio oscillator 28, so as to further demodulate the signals to produce D.C. signals which are proportional to the sum and difference of the amplitudes of the upper and lower sidebands. These D.C. signals are then added at 20 to cancel the upper sideband components and to add the lower sideband components to produce a single sideband resonance signal of twice the normal sideband signal amplitude which is then recorded on recorder 42.

Since most sideband modulation systems can detect signals at both the upper and lower sideband frequencies and since the signal occurs at only one of these frequencies while both frequencies carry noise power the resultant effect of this single sideband system is to reduce the noise power by a factor of 2 and thereby increase the signal-to-noise ratio by $\sqrt{2}$ or 1.4.

In FIG. 3 there are shown exemplary output signals which might be obtained at the outputs of mixers 14 and 18 if one were to sweep the magnetic field $H_0$ over a portion of the spectrum wide enough to include both upper and lower sidebands. This is typically not done in resonance experiments since all of the desired resonance information can be obtained by sweeping only that portion of the magnetic spectrum which includes one of the sidebands, in this case the lower sideband. However, as previously mentioned both sidebands do carry noise power which may be reduced by using the present system. In part $a$ of FIG. 3 the output of mixer 14, including suppressed centerband and both upper and lower sidebands, is shown for a simple benzene line. The peak at the right hand side is the upper sideband signal which is usually obtained using the prior art bandpass filter method as previously described. An exemplary bandpass is illustrated in the drawing by the dashed lines. In part $b$ the corresponding difference output of mixer 18 is shown, and in part $c$ the system output signal which is equal to the sum of the outputs of mixer 14 and 18 is shown.

To the right of each spectrum is shown an illustration of the corresponding noise signals at the respective outputs. These noise signals are of course illustrative only and are not to scale (n.t.s.). The beneficial effect of the new system is readily apparent in part $c$ of this figure which illustrates that the signal power is doubled while the noise power is only increased by a factor of $\sqrt{2}$ thus yielding an increase in signal-to-noise ratio of 1.4.

Turning now to FIG. 4 there is shown a modified embodiment of the system disclosed in FIG. 1. This modification provides satisfactory results if the modulation frequency $\Delta$ is maintained with a relatively narrow range of frequencies. It will be noted that in this modification the second pair of mixers (14 and 18 in FIG. 1) have been eliminated and replaced by a 90° phase shifter 46. The output of R.F. mixer 12 is phase shifted by 90° by phase shifter 44 and added to the output of mixer 16. This composite signal is then detected by audio mixer 46 which is driven by audio oscillator 28 to produce the same lower sideband separation and signal-to-noise ratio improvement which is obtained in the system of FIG. 1.

In FIG. 5 the modified embodiment of FIG. 4 is still further modified to perform Fourier transform spectroscopy. The two audio mixers 14 and 18 of the FIG. 1 embodiment are replaced by multiplexer and analog-to-digital converter 48 and a computer 50 which performs a separate Fourier analysis of both inputs and combines the results linearly to eliminate the effect of one sideband in generally the same manner as described above. A pulser 51 is provided for gating the output of transmitter 30 so that a train of impulses of radio frequency energy are applied to the probe 24 for periodically exciting the sample so as to provide a series of transient exponentially decaying resonance signals. The output of pulser 51 is also provided to multiplexer-converter 48 to provide system synchronization.

The operation of Fourier transform spectrometer apparatus is more fully explained in the copending applications, R. R. Ernst and W. A. Anderson, U.S. Ser. No. 459,006 filed May 26, 1965; R. R. Ernst and F. A. Nelson U.S. Ser. No. 737,213 filed June 14, 1968; and R. R. Ernst and F. A. Nelson U.S. Ser. No. 741,496 filed July 1, 1968, all assigned to the assignee of the present invention.

In one mode of operation the combined mixer frequency $\omega \pm \Delta$ is chosen so that all of the signal information appears on one side of $\omega \pm \Delta$ as illustrated in FIGURE 6a. This mode of operation requires twice as much computer storage space and computer time in order to obtain the $\sqrt{2}$ improvement in system sensitivity. This possible disadvantage is overcome however if the combined mixer frequency $\omega \pm \Delta$ is chosen in the center of the resonance spectrum as shown in FIG. 6b. In this case both the sum and the difference of the Fourier transforms of the outputs of the two mixers give signal information. One of them gives the spectrum on the righthand side and the other gives the spectrum on the lefthand side of the combined mixer frequency. Thus the storage space in the computer memory is reduced by a factor of 2 and the necessary computer time is reduced by a factor of 4. The sensitivity of the system in this case is still improved by a factor of $\sqrt{2}$ over conventional Fourier transform spectroscopy systems.

While the invention has been described with reference to specific preferred embodiments, many alterations and modifications of the invention will be apparent to those of skill in the art after having read the foregoing description and it is understood that this description is for purposes of illustration only and is in no manner intended to be limiting in any way. I intended that the appended claims be interpreted as covering all modifications which fall within the true spirit or scope of my invention.

What is claimed is:

1. In a gyromagnetic resonance spectrometer apparatus wherein a sample is located in a polarizing magnetic field and is excited by an R.F. field to produce gyromagnetic resonance therein, one of said fields being modulated at a low frequency rate to produce resonance signals including upper and lower sidebands, and wherein receiver means are provided for obtaining resonance data from one of said sidebands, the improvement comprising:

a two channel resonance detection network to which said resonance signals are simultaneously applied, one of said channels including signal detection means for selecting from said resonance signals an output signal representative of the sum of said upper and lower sidebands, said other channel including signal detection means for selecting from said resonance signals an output signal representative of the difference of said upper and lower sidebands, and means for combining said sum and difference output signals to eliminate components of one of said sidebands while simultaneously increasing the sensitivity of the apparatus by an appreciable factor.

2. In a gyromagnetic resonance spectrometer apparatus as set forth in claim 1 wherein each of said channels includes an R.F. mixer means for selecting from said resonance signals only audio frequency components.

3. In a gyromagnetic resonance spectrometer apparatus as set forth in claim 2 where each of said channels further includes an audio mixer means for demodulating said audio frequency signals to produce D.C. signals corresponding to the amplitudes of said sum and difference signals.

4. In a gyromagnetic resonance spectrometer apparatus as set forth in claim 1 wherein one of said channels includes an R.F. mixer means and a 90° phase shifting means and the other channel includes an R.F. mixer means such that the output signals of each channel when combined produce an audio signal including components of both upper and lower sidebands.

5. In a gyromagnetic resonance spectrometer apparatus as set forth in claim 4 wherein said signals are combined and then passed through another mixer means which eliminates one of said sidebands and provides an output substantially containing only components of said other sideband.

6. In a Fourier transform spectrometer apparatus where a sample is located in a polarizing magnetic field and is periodically excited by an R.F. field to produce transient exponentially decaying resonance signals which are detected and amplified by a receiver means, said resonance signals including upper and lower sidebands as a result of the modulation of one of said fields, the improvement comprising:

a signal detection circuit including a pair of mixer means the inputs of each being commonly connected to said receiver means for receiving said resonance signals and each being driven by quadrature voltage signals so that one of said mixer means produces an output including the sum of said sidebands and the other mixer means produces an output including the difference of said sidebands, and means coupled to said mixers for simultaneously transforming said outputs by Fourier analysis and then combining the results linearly to eliminate one of the sidebands thus improving the sensitivity of the apparatus.

7. In a Fourier transform spectrometer apparatus as set forth in claim 6 wherein said last named means includes a multiplexer and analog-to-digital converter means which is synchronized with the periodic excitation of said R.F. field.

References Cited

UNITED STATES PATENTS

| 3,147,428 | 9/1964 | Anderson | 324—0.5 |
| 3,173,084 | 3/1965 | Anderson | 324—0.5 |
| 3,376,499 | 4/1968 | Freeman | 324—0.5 |

RUDOLPH V. ROLINEC, Primary Examiner

MICHAEL J. LYNCH, Assistant Examiner

U.S. Cl. X.R.

329—50